Dec. 22, 1959 J. EICHHORN 2,918,263
MIXING LIQUIDS AND SOLIDS
Filed Aug. 9, 1957 2 Sheets-Sheet 1

INVENTOR.
Jacob Eichhorn
BY
Griswold & Burdick
ATTORNEYS

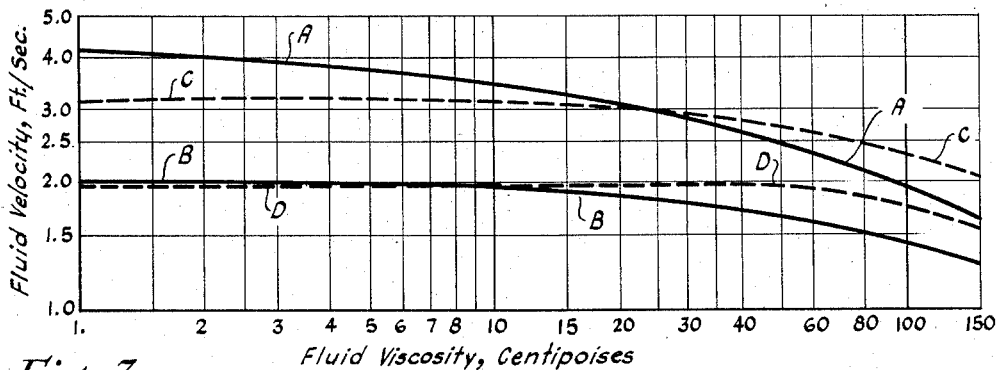
Fig. 3
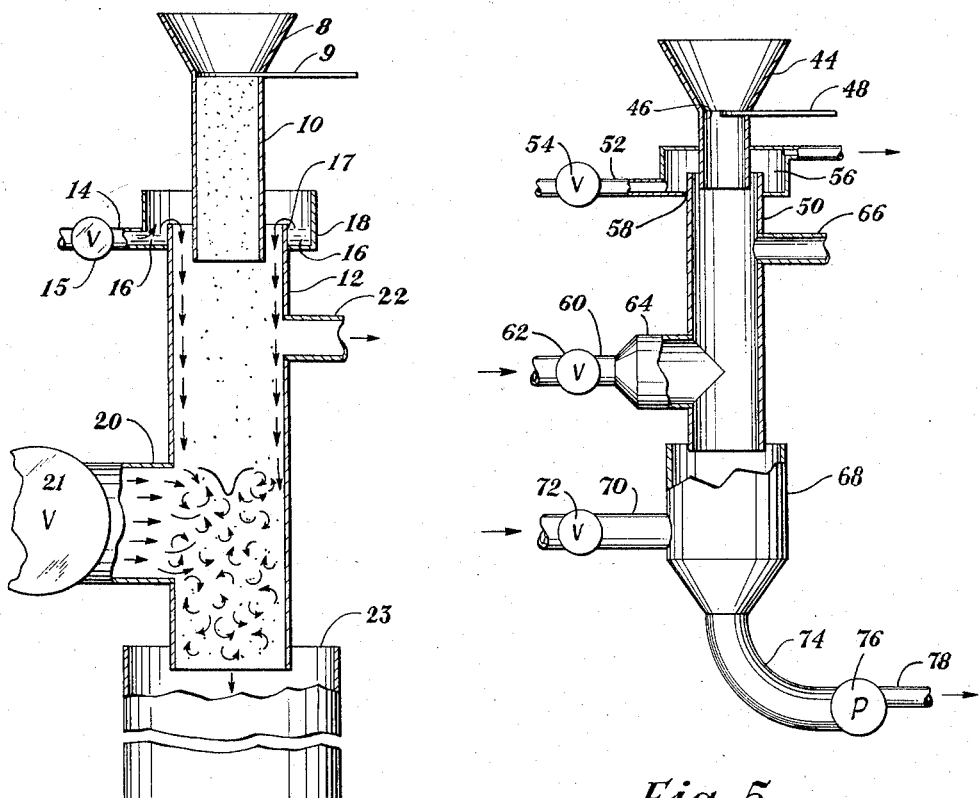
Fig. 4
Fig. 5
INVENTOR.
Jacob Eichhorn
BY
Griswold & Burdick
ATTORNEYS United States Patent Office 2,918,263
Patented Dec. 22, 1959

2,918,263

MIXING LIQUIDS AND SOLIDS

Jacob Eichhorn, Saginaw, Mich., assignor to The Dow Chemical Company, Midland, Mich., a corporation of Delaware Application August 9, 1957, Serial No. 677,379

6 Claims. (Cl. 259—4)

The invention relates to a method of and apparatus for intermixing particulated or comminuted solids and liquids.

The intermixing of solids and liquids to obtain a more or less homogeneous mixture constitutes an essential step in a vast number of domestic and industrial processes. Any improvement which results in a more efficient mixing operation has high economic value. An operation which provides thorough and continuous mixing of a higher ratio of solids to liquid than that provided by conventional mixing operations is particularly desirable.

The principal objects of the invention reside in providing a method of intermixing particulated or comminuted solids and liquids which is highly efficient and in providing a novel apparatus which is relatively simple and inexpensive with which the method of the invention can be practiced. A further object is to provide a method and means for intermixing a high ratio of solids to liquid in a continuous operation. These and related objects will be made clear as the description of the invention proceeds.

The method of the invention consists essentially of feeding a solid in the granular or comminuted state downwardly through a substantially circular feed duct into an open-end substantially circular mixing tube, of greater diameter than the feed duct and substantially concentric therewith and emptying into the mixing tube at a point below the top thereof, feeding a stream of liquid through an inlet duct which enters the mixing tube laterally below the opening of the feed duct so that the stream of liquid changes its direction downwardly abruptly at the time it is contacted by the falling comminuted solid, the inlet duct being of substantially the same diameter as the mixing tube and the liquid entering the mixing tube at sufficient velocity to make continuous contact with the interior of the wall of the mixing tube between a level substantially even with the top of the stream of liquid in the inlet duct and the bottom end of the mixing tube and to fill the mixing tube from a level therein even with the stream of liquid in the inlet duct to the bottom end of the mixing tube except for a central vortex therein which may extend downwardly but not continuously reach the bottom end of the mixing tube.

To attain the objectives of the invention the particulate solid must be free falling through the mixing tube. This condition requires that the diameter or cross-section of the mixing tube be substantially greater than that of the feed duct. How much greater the diameter of the mixing tube must be than the feed duct depends upon a number of factors among which are the characteristics of the liquid and solid, the relative rates of flow, and the actual sizes of the feed duct and mixing tube. Among the characteristics of the solid that affect the ratio required are the degree of fineness, wettability by the liquid employed, and density. For example, a low-density solid, or one which is not readily wet by the liquid employed, tends to float and therefore encourages plugging. Among the characteristics of the liquid that affect the necessary ratio of the mixing tube to the feed duct are viscosity and density. In regard to the rates of flow, generally speaking, the higher the rate of flow of the solid in relation to the rate of flow in the liquid, the greater must be the ratio of the cross-section of the mixing tube to that of the feed duct to avoid plugging.

In regard to the actual sizes of the tube and duct, it is well known that small ducts and tubes plug more readily than larger ones and, therefore, when a small feed duct is employed, the ratio of the cross-section of the mixing tube to that of the feed duct must be considerably greater than when a substantially larger feed duct is employed. For general use, the external diameter of the feed duct should not be over 60 percent of the internal diameter of the mixing tube for tubes of less than about 3 inches in internal diameter and should not be over 70 percent of larger mixing tubes, say those of 5 or 6 inches in diameter. For example, a 3-inch interior diameter mixing tube should be provided with not over about a 1.75-inch external diameter feet duct, but a 6-inch diameter mixing tube could be employed with a feed duct of 4.2 inches in diameter.

When a means is provided to wash down the inner walls of the mixing tube as illustrated in the drawing and explained more fully hereinafter, the ratio of the mixing tube to the feed duct need not be so great as when no wash down means is provided. When the inner wall of the mixing tube is washed down small mixing tubes, say those having external diameter of not over 3 inches, can employ a feed duct having an external diameter up to 70 percent of the internal diameter of the mixing tube and feed ducts having external diameters of 5 or 6 inches can employ feed ducts which are as much as 80 percent of diameter of the mixing tube. For example, a feed duct having a 4-inch external diameter can be employed with a 5-inch internal diameter mixing tube when a washdown system is provided for the mixing tube.

The liquid entering laterally into the mixing tube must not contact the feed duct nor the walls of the mixing tube in the region of the feed duct. Therefore, the duct for the lateral stream of liquid must be substantially below the particulated solid feed duct. The exact distance between the top of the liquid stream and lower end of the feed duct depends upon circumstances similar to those set out in the paragraphs above in relation to the ratio of the mixing tube to that of the feed duct. The distance that the top of the lateral stream of liquid should be below the lower end of the feed duct is usually on the order of that shown in Figures 3 and 4 which is about 2 diameters of the mixing tube. A vertical distance of between 2 and 3 mixing tube diameters is usually employed for mixing tubes of about 3 inches and under but between 1 and 2 diameters may be employed when large diameter mixing tubes, for example those of 5 or 6 inches or more in diameter are used.

By causing the liquid immediately to change directions sharply upon entering the mixing tube, a high degree of turbulence is created in the area where the comminuted solid falls into the turbulent liquid and is thereby thoroughly intermixed therewith. The degree of turbulence appears to be greatest when the level of the intermixing solid and liquid, in the area of contact of the falling solid and entering liquid, is not substantially different from the level of the stream of liquid in the lateral inlet at the point of entrance.

The vortex or conical space in the intermixing liquid and solid in the mixing tube is caused by the swirling motion of the turbulent liquid. The flow rate of the incoming liquid must be sufficient to maintain a volume of liquid in the mixing tube which will prevent the conical space or vortex from extending entirely to the bottom end of the mixing tube except sporadically. If thus extended, some particles of solid would fall through the vortex and be unmixed. So long as the vortex terminates somewhere above the bottom end of the mixing tube, which may be referred to as the lower critical limit of the vortex, some mixing of all solid particles will take place. It is preferred that the vortex should close well above the bottom end of the mixing tube.

When mixing liquids and a comminuted solid according to the invention, the vortex may open completely through to the bottom of the mixing tube at times without preventing the attainment of the objects of the invention. It may open and close sporadically or more-or-less rhythmically, often accompanied by a popping sound. Although operating in this manner does not generally provide the same thoroughness of mixing as that occurring when the vortex is always closed some distance above the bottom of the mixing tube, it is to be recognized as falling within the purview of the invention.

The viscosity of the liquid being mixed is an important factor in considering the liquid flow rate necessary to maintain the recommended volume in the mixing tube. A low-viscosity liquid requires a higher flow rate than a higher-viscosity liquid to maintain a given volume in the mixing tube. The corollary is that the higher the viscosity of the liquid, the lower the flow rate required to maintain a given volume in the mixing tube. However, low-viscosity liquids mix better with a given solid than do high-viscosity liquids at a given volume in the mixing tube. Therefore, satisfactory mixing may be obtained with low-viscosity liquids at a volume which would be insufficient to give satisfactory mixing for higher-viscosity liquids. For low-viscosity liquids, i.e., those below about 20 centipoises, some vortex should be perceptible, but for high-viscosity liquids, i.e., those above about 20 centipoises, no vortex need exist so long as the volume of liquid does not cause the level in the mixing tube to rise above that recommended.

The size of the orifice through which a comminuted solid flows is highly significant in determining the rate of solids discharge therethrough. For a given solids-liquid mixing operation, both the solids orifice and the fluid mixing tube must be of proper size in relation to one another for optimum mixing action.

The inlet duct for the liquid should form an angle of between 60 and 90° inclusive and preferably 90° with the mixing tube. It need not be substantially the same diameter as the mixing tube throughout its entire length but only at the opening into the mixing tube. Therefore, if more convenient, an inlet duct having a smaller diameter over a large portion of its length may be employed but which is enlarged to a diameter substantially equal to that of the mixing tube just before it opens into the mixing tube. Means for deflecting the liquid outwardly as it enters the enlarged portion of the inlet duct may be provided such as by employing a spider consisting of vanes radiating outwardly from an axially positioned shaft in the enlarged portion. A somewhat higher pressure than that which would have been required for an inlet duct which was of substantially uniform diameter throughout its length will necessarily be employed in the narrower portion of such a duct to compensate for the drop in pressure in the enlarged portion of the inlet duct and to make sure that the liquid completely fills the enlarged portion.

One embodiment of the invention includes a second mixing tube of larger diameter than the first positioned below and concentric with the first and a second stream of liquid entering the second mixing tube through a laterally positioned inlet tube. The diameter of the second inlet tube is not critical but greater benefit is derived from one approaching the diameter of the mixing tube. The second mixing tube and second lateral liquid inlet are primarily for dilution purposes.

As a further embodiment of the invention a liquid flush line and a means for distributing a flushing liquid may be provided at the upper end of the upper mixing tube (if there is more than one) to wash down the inside of the walls thereof to prevent possible clogging by accumulating solid particles. As a still further embodiment there may be provided an overflow line leading from the mixing tubes positioned some distance above the inlet duct and preferably on the opposite side of the mixing tube.

Figure 3 shows the logarithmic relationship of liquid viscosity and flow rate of liquid in the mixing tube.

Figure 4 is a schematic view in vertical section of one embodiment of the apparatus of the invention.

Figure 5 is a schematic view in vertical section of another embodiment of the apparatus of the invention.

It is recommended that the comminuted solid have a particle size of less than 840 microns, i.e., will pass through a 20 mesh sieve (U.S. Sieve Series). The invention is applicable to the mixing of liquids and solids which are either soluble or insoluble in the liquid. The invention is particularly directed toward mixing of solids which have a greater mass density than the liquid with which they are being mixed. However, the invention is not limited to the mixing of such solids and liquids.

Solids and liquids which may be made into substantially homogeneous mixtures by the practice of the invention include a wide range of solids and liquids among which are: water and flocculants for flocculating solids suspended therein, water or liquid petroleum hydrocarbons and sand or other propping agents used in fracturing oil-producing formations, water and coal or bituminous dust, and a wide variety of chemicals in the solid state and solvents or dispersants therefor for preparing slurries and solutions used generally in industry.

The rate of discharge, whether in volume units or weight units, of a comminuted solid through a horizontal circular orifice, is a function of the diameter of the orifice. When the logarithm of the flow rate of comminuted solids with a substantially constant head is plotted against the logarithm of the orifice diameter on log-log graph paper, a straight line relationship is obtained. The slope of the line and therefore the exponents of the orifice diameter approach the value of 3.0. According to the findings of Franklin et al. presented in Chemical Engineering Science, volume 4, pages 119–129 (1955), an average of 2.93 was found for the value of $n$ in the formula:

$$V = kD^n$$

where V equals cubic feet per minute, D is the diameter of the orifice, and $k$ is a constant derived from experimental data. For example, considering $n$ as 2.9, the ratio of the discharge of a given comminuted solid from a 4-inch diameter orifice to that from a 2-inch diameter orifice is about $$\frac{57.6}{7.2}$$

or 8 times.

Figure 1:
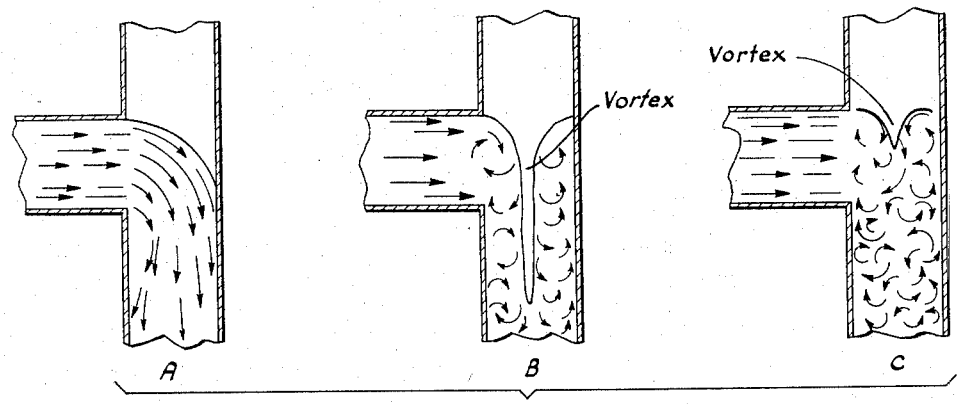
Figure 1 shows the effect of three different velocities on the volume of a given liquid passing through the mixing tube of the apparatus of the invention.

Figure 1 shows diagrammatically the effect on the volume and level of liquid in the mixing tube at three different velocities by diagrams, A, B, and C. The velocity of the liquid in A is less than that in either B or C and is insufficient to provide satisfactory mixing. The velocity of the liquid in B is less than that in C and represents the lowest velocity at which satisfactory mixing occurs. The vortex in B reaches almost to the bottom of the mixing tube and may occasionally open completely, closing rapidly enough, however, to result in satisfactory mixing when intermixing a solid with a low-viscosity liquid. The velocity of the liquid in C is greatest and represents the highest velocity at which satisfactory mixing occurs for liquids other than high viscosity liquids. For highly viscous liquids, the vortex may entirely disappear while proper mixing is obtained so long as the top of the mixing material is not substantially above the top of the incoming stream of liquid.

Figure 2:
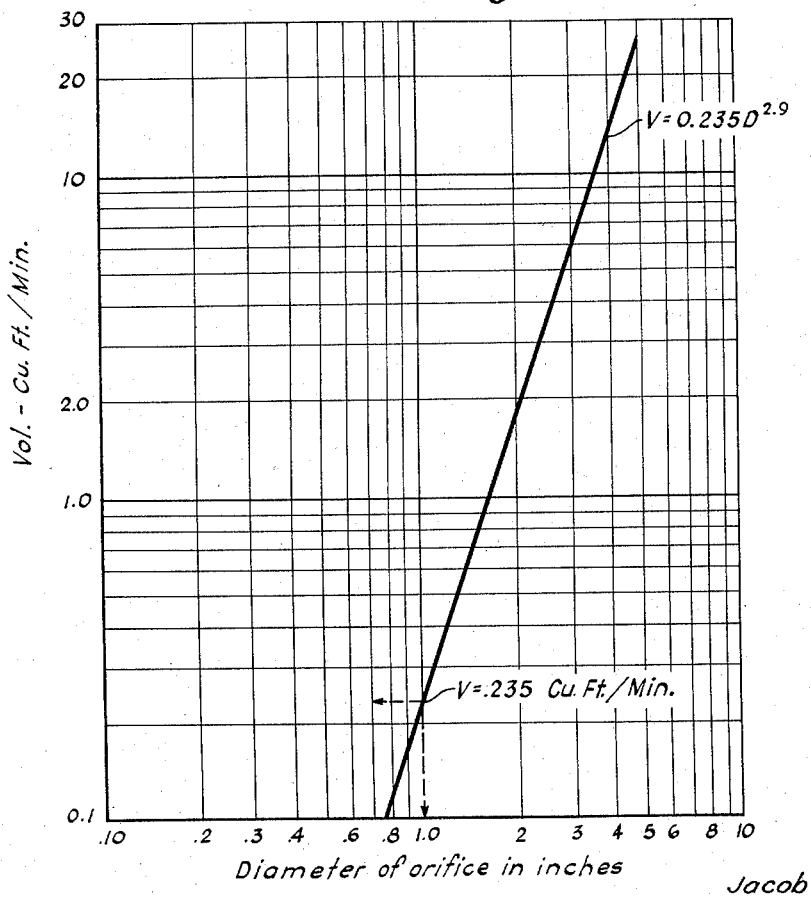
Figure 2 shows the logarithmic relationship between the diameter of circular orifices and the rate of discharge of sand through the orifices.

The graph shown in Figure 2 illustrates the relationship of rate of flow of Ottawa sand having a particle size between 20 and 40 mesh (U.S. Sieve Series) through various diameter orifices plotted on a log-log graph. The rate of flow in cubic feet per minute is plotted on the ordinate and the diameter of the orifice in inches is plotted on the abscissa. When experimental data in these units are plotted, as in Figure 2, they are related by the equation $V = 0.235 D^{2.9}$ since $k$ is shown by the graph to be equal to 0.235. For example, when the orifice diameter is 1 inch, the volume rate of flow is 0.235 cubic feet per minute, as shown in Figure 2.

The graph shown in Figure 3 of the drawing illustrates the effect of velocity on the vortex formed by liquids of different viscosities and the recommended operating velocities for those liquids. The velocities are plotted on the ordinate in feet per second and the viscosities on the abscissa in centipoises on a log-log scale.

The curve of Figure 3 designated A shows the velocities at which a vortex is formed which is barely perceptible. The curve designated B shows the velocities at which a vortex is formed which extends almost to the bottom of the mixing tube and marks the lower operating velocities in regard to the vortex formed.

Curves C and D of Figure 3 show the upper and lower operating limits in feet per minute respectively for liquids having viscosities from 1 to 150 centipoises. Since, in mixing liquids of different viscosities, the degree of mixing obtained when the vortex is of the same depth is greater for low-viscosity liquids than for high-viscosity liquids, the recommended operating velocities do not coincide entirely with the velocities between which a vortex is barely perceptible (curve A) and a vortex which extends almost to the bottom of the mixing tube (curve B).

Further examination of the curves of Figure 3 for liquids having viscosities between 1 and 20, shows that good mixing of low-viscosity liquids may be obtained when the vortex is permitted to extend to its lowest limit but that good mixing is not obtained when the vortex is barely perceptible for low-viscosity liquids. An examination of the curves for liquids having viscosities from 20 to 150, shows that good mixing of higher viscosity liquids may be obtained when the velocity exceeds that at which no vortex exists. It must be borne in mind that the volume in the mixing tube is not to be such that its upper level rises above that in the inlet stream and that good mixing of the high viscosity liquids also requires that the vortex close or terminate well above the lower limit.

Velocities of 2 to 3 feet per second are shown in Figure 3 to give good mixing of liquids having viscosities up to 20 centipoises, but that for liquids having viscosities from 20 to 150 centipoises, the recommended range of velocities gradually decreases from a range of between 2 and 3 feet per second at 20 centipoises down to between 1.7 and 2.3 feet per second at 100 centipoises and extends to a range of about between 1.5 and 2.1 feet per second at 150 centipoises.

Referring to the apparatus shown schematically in Figure 4, there are shown hopper 8 having sliding valve 9 therein and vertical open-end feed duct 10 extending, downwardly from hopper 8, a short distance into the upper end of vertical open-end mixing tube 12. Tube 12 is of greater diameter than feed tube duct 10 and is positioned in concentric alignment with feed duct 10. Flushing-liquid inlet 14 having valve 15 therein is shown leading into annular distributing trough 16 positioned about mixing tube 12 a short distance below the upper end thereof thereby converting that portion of mixing tube 12 which extends above the bottom of trough 16 into inner wall 17 of trough 16. Outer wall 18 of trough 16 extends upwardly beyond the height of 17. Wall 17 serves as a weir and causes the flushing liquid to flow over it thereby washing down the interior of the walls of mixing tube 12.

Liquid inlet duct 20, of the same diameter as mixing tube 12 and having valve 21 therein, joins mixing tube 12 at right angles thereto. Overflow line 22 provides means for removing excess liquid if the rate of discharge from 20 should be too great to pass out the lower end of mixing tube 12 and therefore should cause the liquid-solid level in mixing tube 12 to rise toward the upper end thereof. Receiver 23 is positioned to receive the intermixed solid and liquid.

In practicing the invention according to the embodiment of Figure 4, a comminuted or granular solid, preferably having about a 20 mesh particle size, is placed in hopper 8 with valve 9 closed. Flushing liquid, which may be the liquid with which the solids are to be mixed or any liquid compatible therewith, is admitted through line 14, by opening valve 15, at a rate of flow which fills trough 16 and flows over the weir 17 to wash down the inside of the wall of mixing tube 12. Valve 9 is then opened to admit comminuted solid and valve 21 in duct 20 is opened to admit a stream of the liquid with which the comminuted solid is to be mixed in tube 12. The introduction of liquid is made at a rate of flow sufficient to cover the entire interior wall of mixing tube 12 from a level in the mixing tube substantially even with the top of the stream of liquid in 20 to the bottom of the mixing tube and sufficient in volume to fill substantially mixing tube 12 from that level downwardly, except for a vortex which may exist at the center but does not extend to the bottom of the mixing tube. The falling comminuted solid is thus caused to fall into and be engulfed by the swirling turbulent stream of liquid at the exact time the liquid is caused to turn abruptly downwardly from its lateral entry direction. The mixed solid and liquid pass from mixing tube 12 into receiver 23.

As has been pointed out, low-viscosity liquids mix sufficiently when the volume of liquid and granular or comminuted solid in mixing chamber 12 permits a vortex or cone to extend almost to the bottom of tube 12, but good mixing of high-viscosity liquids requires the volume to be such that the vortex terminates well above the level permissible with low-viscosity liquids, and furthermore good mixing of high viscosity liquids is obtained when no vortex exists so long as the level of the liquid in the mixing tube does not rise substantially above the top level in the inlet tube.

The practice of the invention is illustrated by the following examples.

An apparatus of the type shown in Figure 4 was used in the examples. The comminuted solid and liquid which were intermixed, the diameters of the feed aperture and tubes, the rate of flow, and ratio of solids to liquid are set out in the table below.

Excellent mixing was obtained in all the examples. An examination of the ratio of flow of solid in pounds to liquid in gallons per minute show a higher proportion of solids to liquid than has heretofore been obtainable by methods of mixing known to the inventor.

Figure 5 shows certain modifications of the apparatus of Figure 4. Hopper 44 through orifice 46 in the bottom thereof, controlled by valve 48, provides a supply of comminuted or granular solid to upper mixing tube 50 as in the apparatus of Figure 4. Flushing-liquid line 52, having valve 54 therein, leads into annular distributor trough 56 positioned near the top of mixing tube 50, the upper portion of the walls of mixing tube 50 serving as the inner wall of annular trough 56 as in Figure 4.

Trough 56 has perforations 58 (not present in Figure 4) in the bottom thereof adjacent to the wall of mixing tube 50 so that the perforations extend through the wall of mixing tube 50 to provide liquid for washing down the interior thereof. Liquid inlet line 60, having valve 62 therein, is shown with enlarged portion 64 forming the outlet thereof. Overflow line 66 is shown positioned similarly to line 22 of Figure 4.

There is also shown in Figure 5, second mixing tube 68

Table

| Example | Diameter, inches | | Solids Used | Liquid Used and Viscosity | Liquid Flow, Gal./Min. | Solids Flow, Pounds/Min. | Ratio of Solid to Liquid [1] |
|---|---|---|---|---|---|---|---|
| 1 | Feed aperture | 3 | Ottawa Sand | Water, Vis.=1 cp | 250 | 1,250 | 5.0 |
|   | Mixing tube | 6 | | | | | |
|   | Liq. inlet tube | 6 | | | | | |
| 2 | (Same as Ex. 1) | | (Same as Ex. 1) | (Same as Ex. 1) | 295 | 1,875 | 6.3 |
| 3 | Feed aperture | 1.22 | ....do | ....do | 17 | 60 | 3.5 |
|   | Mixing tube | 1.8 | | | | | |
|   | Liq. inlet tube | 1.8 | | | | | |
| 4 | Feed aperture | 0.75 | ....do | Glycerine, Vis.=125 cps | 6.5 | 17 | 2.5 |
|   | Mixing tube | 1 | | | | | |
|   | Liq. inlet tube | 1 | | | | | |
| 5 | Feed aperture | 0.75 | ....do | Glycerine, Vis.=15 cps | 4.5 | 17 | 3.8 |
|   | Mixing tube | 2 | | | | | |
|   | Liq. inlet tube | 2 | | | | | |
| 6 | (Same as Ex. 5) | | (Same as Ex. 5) | (Same as Ex. 5) | 8 | 17 | 2.1 |
| 7 | Feed aperture | 0.53 | Water-soluble Polyacrylamide | Water | 3 | 0.8 | 0.27 |
|   | Mixing tube | 2 | | | | | |
|   | Liq. inlet tube | 2 | | | | | |
| 8 | (Same as Ex. 7) | | (Same as Ex. 7) | ....do | 7 | 0.8 | 0.11 |
| 9 | Feed aperture | 0.47 | Coal dust, 7.8% retained on #50 and 40.2% through #200 sieve (U.S. Sieve Series). | ....do | 3.5 | 1.5 | 0.43 |
|   | Mixing tube | 2 | | | | | |
|   | Liq. inlet tube | 2 | | | | | |
| 10 | (Same as Ex. 9) | | (Same as Ex. 9) | ....do | 6.4 | 1.5 | 0.23 |

[1] Ratio of solid in lb./min. to liquid volume in gal./min.

of larger diameter than mixing tube 50 and aligned concentrically with mixing tube 50 immediately therebelow at a height that mixing tube 50 extends into second mixing tube 68 a short distance. Second liquid inlet duct 70, having valve 72 therein, is shown leading into tube 68. Exit tube 74 is integrally attached to second mixing tube 68 and leads to pump 76 which provides the impelling force for removing the intermixed granular or comminuted solid and liquid from the apparatus through line 78 to a place of use or storage (not shown). An overflow line may be provided in tube 68, similar to 66 in tube 50, as a precaution against loss if the liquid entering through line 70 becomes excessive.

The method and apparatus of the invention offer a number of advantages chief among which is highly efficient mixing since the rate of mixing is high and the degree of mixing is thorough. It also offers the advantage of continuous mixing of a solid and a liquid where the ratio of solid to liquid is higher than is normally obtainable by known apparatuses or methods. Other advantages are a low-cost apparatus and a relatively simple method of operation. The invention provides for mixing a wide range of solids with liquids of widely differing viscosities. The rates of flow are independently controlled and there is no plugging by accumulating solid particles when the method of the invention is properly observed.

Having described the invention, what is claimed and desired to be protected by Letters Patent is:

1. The apparatus for preparing a mixture of a liquid and a particulate solid comprising a vertical cylindrical mixing tube having a top entry end and a bottom exit end, a particulate solid feed duct of smaller outer diameter than the inner diameter of the mixing tube positioned concentrically above the mixing tube, a cylindrical liquid inlet tube of substantially the same diameter as the mixing tube positioned between the entry end and exit end of the mixing tube at an angle of between 60° and 90° inclusive therewith through which a stream of liquid may be supplied at a sufficient velocity to maintain a volume in the mixing tube so that the upper level therein is not substantially above the top level of the stream of liquid in the inlet tube and so that the liquid fills the mixing tube from said upper level to the bottom exit end except for a vortex which may extend downwardly but not reach the exit end of the mixing tube.

2. The apparatus of claim 1 having an annular distributing trough positioned about the entry end of the mixing tube, and a flush line connected to the trough, the outer wall of said trough extending above the top of the wall of the mixing tube, thereby converting the top of said mixing tube wall into a weir.

3. The apparatus of claim 2 wherein the mixing tube is provided with an overflow line positioned above the liquid inlet line and below the distributing trough.

4. The apparatus for mixing a liquid and a comminuted solid comprising: a vertical cylindrical open-end comminuted solid feed tube; a vertical cylindrical open-end mixing tube of greater diameter than the feed tube positioned substantially concentrically below the feed tube; an inlet liquid line opening into said mixing tube through an outlet opening having substantially the same diameter as that of the mixing tube; an overflow line leading from the mixing tube positioned below its upper end and above the inlet line for the removal of excess liquid; a distributing annular trough positioned near the top of the mixing tube having an outer wall extending upwardly to a point above the top edge of the wall of the mixing tube, and a line for admitting flushing liquids into said trough; a second mixing tube positioned concentrically below the first mixing tube of greater diameter than the first mixing tube; and a second inlet liquid line emptying into the second mixing tube.

5. The apparatus of claim 4 wherein the distributing trough has apertures in the bottom thereof leading to the interior of the mixing tube for washing down the wall thereof.

6. The method of mixing a particulate solid and liquid to form a substantially homogeneous mixture which comprises the steps of confining the particulate solid in a downwardly directed stream into a less-confined zone therebelow to insure a free-falling stream of the solid through said zone, introducing simultaneously therewith into said zone a lateral stream of liquid of substantially the same size cross-section as said free-falling solid stream at a point sufficiently below the entrance of said particulate solid into said zone to prevent wetting and clogging thereof, controlling the rate of flow of said liquid to maintain said zone filled to a level substantially even with the top of said lateral stream except for an irregularly forming vortex extending downwardly but not entirely through said zone.

References Cited in the file of this patent

UNITED STATES PATENTS

| 1,953,405 | Hedberg | Apr. 3, 1934 |
| 1,968,334 | Crowder et al. | July 31, 1934 |
| 2,192,172 | Anderson | Mar. 5, 1940 |
| 2,601,320 | Price | June 24, 1952 |
| 2,724,580 | Revallier | Nov. 22, 1955 |

FOREIGN PATENTS

| 815,247 | France | Apr. 5, 1937 |